June 6, 1933.   R. C. HAYS   1,913,078
TANK FILLER
Filed April 1, 1931   2 Sheets-Sheet 1
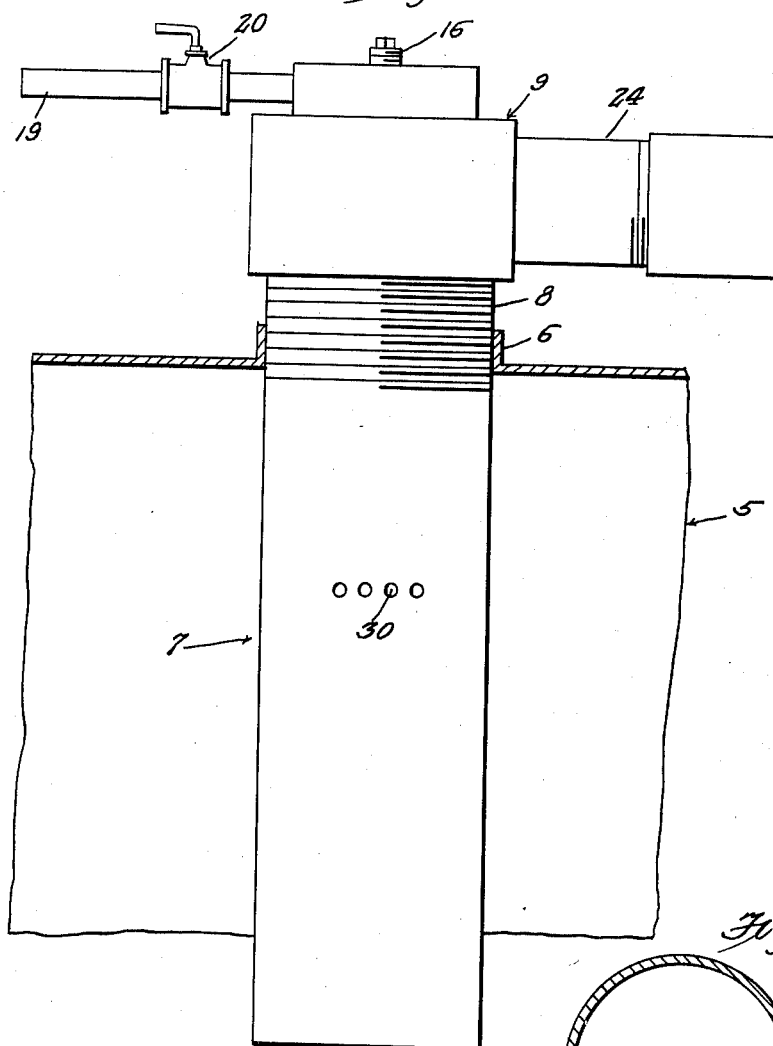
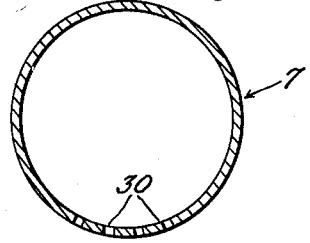
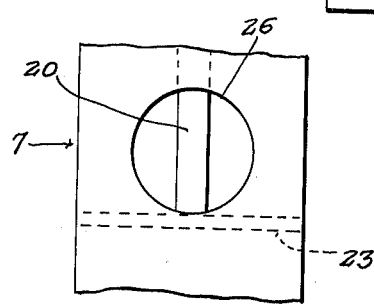
Inventor
Ralph C. Hays,
By Clarence A. O'Brien
Attorney

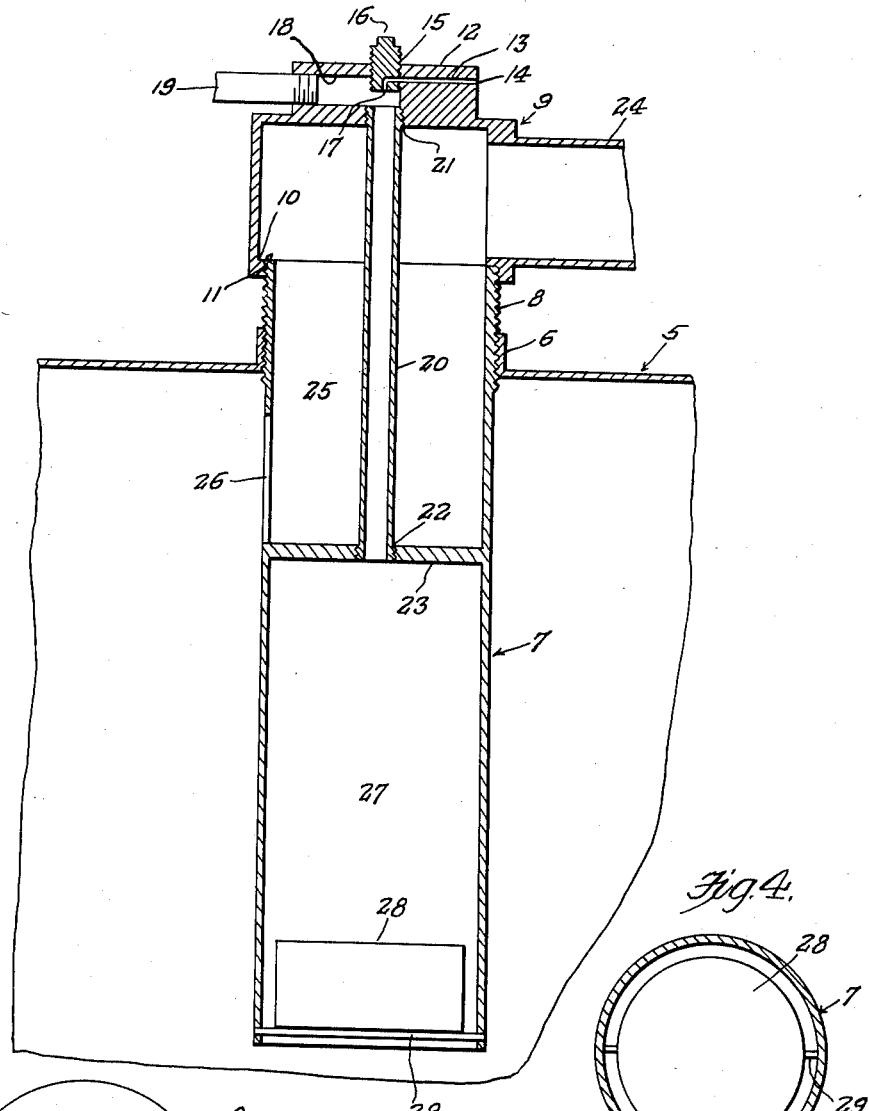

Patented June 6, 1933

1,913,078

UNITED STATES PATENT OFFICE

RALPH C. HAYS, OF LIBERAL, KANSAS

TANK FILLER

Application filed April 1, 1931. Serial No. 527,037.

This invention relates generally to means for filling tanks, and particularly to a new and novel vacuum means for filling gasoline and oil tanks, barrels, and the like containers, and more specifically to a means of this type operable through the vacuum or suction produced by the manifold or vacuum tank of an internal combustion engine.

It is an object of this invention to provide a simple and inexpensive and highly efficient device of the character described which may be incorporated as a permanent fixture in a tank or container to replace the regulation filler plug thereof.

It is also an object of this invention to provide a device of the character described which is adapted to have attached to it a hose or pipe connection with either such manifold or such vacuum tank and also a filling pipe leading from a reservoir of the liquid with which it is desired to fill the tank.

It is also an object of this invention to provide a device of the character described which may be permanently incorporated in the oil and gasoline tank of an automobile, motor vehicle or tractor of any type by replacing the regular filler cap or plug, whereby the tank may be filled with liquid while the engine or motor is being warmed up, and which has an entirely automatic cut-off means which prevents over-filling, since, when the liquid has reached a predetermined level within the tank, the said automatic means will prevent the ingress of any more liquid to cause such over-filling.

It is a further object of this invention to provide and utilize a device of the character described which enables the operator of such a motor vehicle or the like to engage himself in other tasks while the tanks of the motor vehicle or the like are being properly filled, and to so fill a tank as to prevent the waste of liquid being transferred from a reservoir to said tank, and further prevent the ingress of dirt and dust especially as occurs in windy, unprotected places, such as in a wheat field or other place in which fuel and lubricant and the like must be transferred from exposed reservoirs to the tanks of tractors and the like.

These and other objects of the invention, its nature, and its composition and arrangement and combination of parts will be readily understood by any one acquainted with the art to which this invention relates upon consulting the following descriptions of the drawings, in which:—

Figure 1 is a general side elevational view of the device of my invention showing the manner of its installation in a tank which is illustrated partly broken away.

Figure 2 is a vertical transverse cross-sectional view through Figure 1 taken at right angles thereto.

Figure 3 is a top plan view of Figure 1.

Figure 4 is a transverse horizontal cross sectional view taken through the lower part of my device.

Figure 5 is a similar cross sectional view taken at the levels of the holes shown in Figure 1.

Figure 6 is an elevational view of the outlet port of my device.

Referring in detail to the drawings the numeral 5 generally designates the tank in which my device is being installed, and provided with the conventional internally screw-threaded flanged port 6, through which is projected for a greater part of its length a vertically elongated hollow cylinder 7 having on its upper end portion the external screw-threads 8 engaging the flanged port 6. The cylinder 7 is open at the top and at the bottom. Upon its upper end is screw-threaded a short hollow cylindrical closed topped open bottomed casing 9, which is provided at its lower edge with an internal flange 10 having the internal screw-threads 11 for engaging upon the screw-threads 8 of the cylinder 7.

Centrally upon the top wall of the casing 9 is disposed a reduced solid disk-like portion 12 which has projected from one side thereof an air inlet passage 13 which enters from the side 14 and penetrates toward a central screw-threaded opening 15 in which is adapted to be placed a plug 16 having an angular air passage therein as at 17. The plug 16 is designed to be turned so as to communicate its angular air passage 17 with the air passage 14 or to close off the passage 14 as desired. Directly opposite the air passage 14 is an enlarged passage 18 communicating with the central aperture 15. In the passage 18 is designed to be screw-threaded a pipe 19 which has a hand valve 20, and the pipe 19 is communicated with the manifold or vacuum tank of the internal combustion engine. Projecting downwardly and centrally of the cylinder 7 from a continuation of the central bore or aperture 15 is suction pipe 21 screw-threaded at its upper end at 21' in the lower end of the bore 15 and at its lower end screw-threaded as at 22 in an aperture centrally formed in the horizontal partition 23 in an intermediate portion of the cylinder 7. At one side wall of the head 9 a large liquid intake pipe 24 communicates with the interior of the head and the intake chamber 25 formed by the head and the portion of the cylinder 7 above the partition 23. On an opposite side from the intake pipe 24 is disposed directly above the partition 23 in the cylinder 7 a discharge port 26. The space within the cylinder 7 below the partition 23 is designated 27 and it constitutes the float chamber of the device in which freely operates a float 28 of drum type which normally rests upon and is confined within the cylinder 7 by a pin 29 across the lower end of the cylinder 7. Just below the level of the partition 23 there is formed a row of holes 30 communicating through the wall of the cylinder 7 into the float chamber 27.

It will be observed that when the engine referred to is running, a vacuum or suction will be formed in the pipe 19 which, when the valve 20 is opened, will be communicated to the passage 18. Then, when the air passage 14 is closed by turning the plug 16, the vacuum will be communicated through the suction tube 21 to the interior of the tank 5. The pipe 24 having been connected with a liquid reservoir, the action of the device under the influence of the vacuum described will be to draw liquid from the reservoir through said pipe 24 into the intake chamber 25 and to discharge it into the tank 5 through the discharge port 26. As the liquid within the tank 5 rises the float 28 will be upwardly moved, until finally, the float 28 closes the lower end of the suction tube 21, and by closing communication of the vacuum to the interior of the tank 5 causes a cessation of inflow of fluid into the tank 5. The lower end of the suction tube 21 is, of course, placed at a predetermined level. This feature positively and automatically prevents over-flowing or over-filling of the tank 5, and consequently conserves quantities of fluid which in other types of filling means for tanks ordinarily cause the tank to overflow and waste, when the tank and the filling means are not constantly watched and attended. It will also be observed that no air being permitted to pass through the device during the filling operation, no extraneous substances such as dust and dirt can be introduced into the tank 5 and its contents, except through their presence in the fluid in the reservoir. Thus by properly straining the fluid in the reservoirs the fluid may be introduced into the tank 5 in perfect condition, without effort, and without additional expense, and the operation is carried on completely and safely and satisfactorily without attention from the operator of the internal combustion engine which operates the device.

It is to be definitely understood that I do not desire to limit the application of this invention to the particular modification set out herein to illustrate the principle thereof, and any change or changes may be made in material and arrangement and combination of parts consistent with the spirit and scope of the invention.

What is claimed is:—

1. A suction operated filling device for the fuel tank of an internal combustion engine comprising a vertical open ended cylindrical casing disposed to depend within the tank with the upper portion thereof exterior of the tank, a partition intermediate the ends of the casing and provided with a central opening, a suction tube extending upwardly from the opening in the partition; a head on the upper end of the casing, comprising a hollow body having a fuel intake means at one side, a block in its upper end provided in one side with a suction passage leading to the upper end of said suction tube, and an oppositely located relatively minute air intake passage in said block having communication with said suction passage and suction tube, and manual means in said block cooperable with the inward terminus of the air intake passage for closing and opening communication thereof with the suction passage and suction tube, said casing having a fuel entry port above said partition, and a free float in said casing below said partition, and adapted to rise and engage the lower end of the suction tube so as to close it as the tank is filled.

2. A suction operated filling device for a tank comprising a tubular member screw-threaded in an opening in the tank, a head on the outer end of the member, a fluid intake, a suction pipe, and a controllable air inlet located in said head, a suction tube in communication with the suction pipe and air inlet and depending into the tubular member, a partition dividing the tubular member into upper and lower chambers, said suction tube being communicated through the partition with the lower chamber, said upper chamber having a fluid discharge port communicating with the tank, said lower chamber being open to the tank, and automatic float means in the lower chamber for closing the lower end of the suction tube as the fluid reaches a predetermined level in the tank.

In testimony whereof I affix my signature.

RALPH C. HAYS.